United States Patent
Frohs

(10) Patent No.: US 7,276,284 B2
(45) Date of Patent: Oct. 2, 2007

(54) CARBON FIBER REINFORCED COKE FROM THE DELAYED COKER

(75) Inventor: Wilhelm Frohs, Allmannshofen (DE)

(73) Assignee: SGL-Carbon AG, Wiesbaden (DE)

( * ) Notice: Subject to any disclaimer, the term of this patent is extended or adjusted under 35 U.S.C. 154(b) by 127 days.

(21) Appl. No.: 10/740,073

(22) Filed: Dec. 18, 2003

(65) Prior Publication Data
US 2007/0134422 A1    Jun. 14, 2007

(51) Int. Cl.
*B32B 9/00* (2006.01)

(52) U.S. Cl. .................................................. 428/408

(58) Field of Classification Search ............... 428/408; 423/447.1
See application file for complete search history.

(56) References Cited

U.S. PATENT DOCUMENTS

| | | | | |
|---|---|---|---|---|
| 3,936,535 A | * | 2/1976 | Boder | 427/228 |
| 4,026,998 A | * | 5/1977 | Jorro et al. | 423/470 |
| 4,715,945 A | * | 12/1987 | Dickakian | 208/40 |
| 4,772,502 A | * | 9/1988 | Okura et al. | 428/74 |
| 4,772,508 A | * | 9/1988 | Brassell | 428/218 |
| 5,286,371 A | * | 2/1994 | Goval et al. | 208/131 |
| 5,372,702 A | * | 12/1994 | Kojima et al. | 208/39 |
| 6,013,371 A | * | 1/2000 | Hager et al. | 428/408 |

FOREIGN PATENT DOCUMENTS

| | | | |
|---|---|---|---|
| GB | 1434824 | * | 5/1976 |
| GB | 1548046 | * | 4/1979 |

* cited by examiner

*Primary Examiner*—Jennifer McNeil
*Assistant Examiner*—Daniel Miller
(74) *Attorney, Agent, or Firm*—Laurence A. Greenberg; Werner H. Stemer; Ralph E. Locher

(57) ABSTRACT

A number of properties of polygranular carbon bodies can be improved by small quantities of carbon fibers being incorporated in the formulations for production of such bodies. However, it has proven difficult for carbon fibers to be introduced into the green mixture. Therefore, a high-grade coke, preferably needle coke, in accordance with the invention is used to produce the polygranular carbon bodies. This high-grade coke according to the invention contains the carbon fibers simply as a result of being produced in the delayed coker of a refinery. All the main details of the way in which a coke of this type is mixed into the green mixture correspond to the reliably managed processing of other needle cokes.

12 Claims, No Drawings

CARBON FIBER REINFORCED COKE FROM THE DELAYED COKER

BACKGROUND OF THE INVENTION

FIELD OF THE INVENTION

The invention relates to a carbon fiber-reinforced coke, preferably needle coke, which was formed by common coking of the mixture of a small proportion of cut carbon fibers and of viscose refinery residues or of coal tars and pitches.

Furthermore, the invention relates to the use of the carbon fiber-reinforced cokes according to the invention in polygranular carbon bodies for various applications. The term polygranular carbon bodies is to be understood as meaning amorphous or graphitic carbon materials which contain at least 70% by weight of carbon. These polygranular carbon bodies include carbon electrodes and their connecting pieces, known as nipples, which in the screw-connected state are used as a section for the melting of, for example, electric steel; they include fine-grain graphites for various mechanical and electrical applications and also graphites for use in nuclear reactors, in blast furnaces and as cathodes and anodes for aluminum fused-salt electrolysis.

It has been known for decades to exploit the advantageous properties of carbon fibers to improve the properties of synthetically produced carbon bodies. Corresponding patents have also been in existence since the 1970s. At that time, the prices of the carbon fibers were still very high, and consequently the economic significance of synthetically produced carbon fibers which had been reinforced with carbon fibers was low. This changed as the prices of the carbon fibers dropped, and the number of patents dealing with the above topic increased. The following text will deal with a number of patents from the prior art, in particular relating to carbon fiber-containing graphite electrodes and preferably the connecting pieces (nipples) thereof.

Various types of fibers have been used:
1. Carbon fibers based on PAN (polyacrylonitrile), based on mesophase pitch and based on isotropic pitch.
2. Oxidized PAN fibers (see below for a definition), cf. German laid-open specification DE-A 26 59 374, priority date Dec. 31, 1975.
3. Untreated organic fibers, such as PAN fibers or cellulose fibers, cf. claims 1 and 2 of DD 295 621, granted on Oct. 27.1983.

The types of fibers mentioned have been introduced into the formulations in various textile make-ups; by way of example, the fiber strands had different numbers of filaments. In addition to the type of fiber and the textile make-up, the way in which the fibers were introduced into the green mixture for graphite electrodes and associated nipples was a further significant feature.

The following documents are cited in connection with the various ways of introducing the fibers:

U.S. Pat. No. 4,998,709 should be mentioned, since it is cited in other documents in connection with carbon fiber-containing electrodes or nipples. This patent, which was granted on Mar. 12, 1991, describes 8 to 20% by weight of carbon fibers being mixed in. Types of fibers mentioned are those which are based on pitch, in particular mesophase pitch. However, fibers based on PAN were also possible. Neither the description nor the example describes any technique used to mix in the fibers.

U.S. Pat. No. 6,440,563, which was granted on Aug. 27, 2002, deals with carbon nipples which had been produced from a mixture of calcined coke, pitch and carbon fibers based on mesophase pitch. The proportion of the carbon fibers was given as 0.5 to 5.0% by weight, based on 100 parts of coke, in claim 2. The way in which the fibers are introduced is described in Example 1, column 5, lines 43 ff. First of all, coke, binder pitch, carbon fibers and other constituents were combined in a cylinder mixer. In this context, it should be noted that binder pitch of this type softens at approximately 80° C. and is in the form of a solid at room temperature. The overall mixture, which is granular at room temperature, was then heated to 160° C. over the course of one hour and, after moderate cooling, was extruded at 110° C. as a solid strand, from which the nipples were produced.

U.S. Pat. No. 6,395,220, granted on May 28, 2002, deals with the production of a binder pitch which contains carbon fibers. This mixture was used to produce carbon bodies which had a substantially homogenous distribution of randomly oriented carbon fibers. The particular feature of this technique was the production of a premix of liquid pitch and carbon fibers, which was added to the dry substances in this form.

Despite the different ways of introducing the fibers into the overall mixtures, the three documents cited have the following process steps for production of carbon bodies in common:
1. Mixing of the raw materials, 2. Shaping, 3. Heat treatment, etc.

This means:
1. In each of the three cases, the carbon fibers were incorporated in the binder of the overall mixture. The binder was selected not with a view to ensuring optimum interaction of the carbon fibers with this binder, but rather, for example, with a view to optimizing processability of the green mixture, to achieving in relative terms the optimum electrical conductivity of the marketed product, the optimum binder pitch cost and numerous other arguments.

Following the heat treatment, the binder was in the form of a coked solid differing from the coke used in the overall mixture.

2. During the coking, the binder, which more or less completely surrounds the carbon fibers after they have been mixed in, shrank, losing from 40 to 50% of its mass. Whether this shrinkage took place radially or axially parallel with respect to the individual carbon fibers, whether cracks occurred in this binder and whether the adhesion of the binder to the fiber was retained or lost depended on the process conditions, on the composition of the formulation, on the interaction between fiber surface and binder during the various thermal decomposition stages and other factors. It can be inferred from these relationships that the coking process and the subsequent graphitization were not aimed at optimum interaction of the carbon fibers with this binder, but rather the type of thermal processes and the way in which they were carried out were determined, for example, by the plant available, their economic viability, the type and quantity of off-gases and many other arguments.

The limited success of incorporation of the carbon fibers into the coked binder resulting from the shrinkage resulted in reinforcement of the carbon body to a limited extent and therefore in improvements in the properties of the carbon body to a limited extent.

3. The carbon fiber was located next to the grain of coke which formed the majority of the overall mixture.

The British patent No. 1434824, granted on May 05, 1976, mentions a different way of introducing the fibers into the carbon body. Page 1, lines 81 to 90 makes the sweeping statement that the carbon fibers can be added to the cokeable raw material for the production of the calcined coke grains. In this way, the coke was formed around the carbon fibers and the individual coke grain was reinforced by the carbon fibers. It was then possible to produce a carbon body from formulations which either only contained cokes reinforced with carbon fibers or contained cokes which had been proportionately reinforced with carbon fibers.

This patent did not give any details as to what type of raw material was used for production of the calcined coke grains and what process was used to convert this raw material into coke for the production of the calcined coke grains. As has been shown above with reference to the incorporation of the carbon fibers into the binder to be coked, the choice of raw material and the choice of process for producing a coke reinforced with carbon fibers were significant factors in the result of the reinforcing action.

The production of polygranular carbon bodies was based on formulations in which quantitatively the most significant proportion is coke. This formulation constituent was the crucial factor in determining the properties of the polygranular carbon bodies, and consequently improvements to the properties of these bodies were linked to improvements in the coke. Accordingly, when producing carbon bodies, the manufacturers looked at achieving good coke properties in addition to process engineering optimizations.

In the 1950s, needle coke was produced for the first time in the coking device of a refinery. An application, namely the graphite electrode for the melting of steel scrap, was found for this product. In the subsequent decades, needle coke became indispensable on account of its good properties for the production of high-quality graphite electrodes and associated nipples. The production capacity for needle cokes of this type remained limited, and to date these cokes have only been produced in a few refineries throughout the world. The crucial process for producing these cokes in the refineries is the delayed coking process. Significant features and effects of this process are as follows:

1. Only the delayed coking process, out of the wide range of comparable conversion processes used in the mineral oil industry, such as fluid coking or the flexicoking process (cf. below for definitions), can be used to produce needle coke.
2. The cokes produced using this process, and their properties, are particularly valuable preferably for graphite electrodes.

Therefore, a subject of the present invention was the discovery a raw material and a process for the common coking of the mixture of raw material, such as viscose refinery residues or such as coal tars and pitches, and a small proportion of cut carbon fibers, resulting in a high-grade carbon fiber-reinforced coke, preferably a modern high-grade carbon fiber-reinforced needle coke.

A further subject of the present invention was the use of a high-grade carbon fiber-reinforced coke, preferably a modern high-grade carbon fiber-reinforced needle coke, in polygranular carbon bodies.

The advantages included the selection of favorable raw materials, such as refinery residues, and a simple technique for mixing carbon fibers and high-grade liquid refinery residues, and also in the fact that the common coking of carbon fibers and refinery residue in the delayed coker was not determined by the boundary conditions of the production (carbonization) of the carbon bodies.

Another advantage was the good metering properties of the carbon fiber-reinforced special coke, which it was possible to process using conventional measures during production of the mixture for the green manufacture of the carbon bodies and avoided, for example, the pilling of fibers as they were mixed in.

The common coking of refinery residue and carbon fibers resulted in a carbon fiber-reinforced coke grain which was of a better quality than a binder which had been coked in a carbon body and contained carbon fibers.

The terms used in the present text are to be understood in the following way:

A delayed coker is a device used in an oil refinery in which high-molecular-weight, viscose residues are coked (delayed coking process). The delayed coker substantially comprises two units, a coker furnace and two alternately deployed coker drums. In a coker furnace, the refinery residues are heated to at most 600° C., but preferably up to approx. 550° C. The coker drums are operated at a pressure of at most 0.9 MPa.

Fluid coking is a continuous process in which, in addition to liquid constituents, pellet-like solid particles are formed in a steam-assisted fluidized bed, from which the particles can easily be withdrawn. The particles do not have to be mechanically cut out of a larger mass of coke, as in the case of the coker drums of the delayed coker.

The flexicoking process is a process which represents an improvement on fluid coking. The improvement relates to a substantial conversion of the raw materials used into gaseous products, for which purpose oxygen and/or steam are blown into the gasification reactors. Only a small proportion of the raw materials is converted into coke.

A thermal cracker is an oil refinery device in which high-molecular-weight residues are cracked using thermal energy (thermal cracking). In addition to other gaseous and liquid refinery products, high-molecular-weight, viscose residues which are suitable for further processing in the delayed coker are formed.

The FCC process (fluidized catalytic cracking process) is a process in which high-molecular-weight residues from the vacuum distillation of a refinery are cracked using thermal energy and catalysts in a fluidized bed. In addition to other gaseous and liquid refinery products, high-molecular-weight viscose residues (slurries, decant oils) which are suitable for further processing in the delayed coker are formed.

Visbreaking is a mild thermal cracking process which takes place at low pressure. The high-molecular-weight viscose residues which remain in this case too are suitable for further processing in a delayed coker.

PAN is the abbreviation for polyacrylonitrile. PAN fibers are the precursor for the production of carbon fibers, which is carried out at temperatures of up to 1400° C. (HF types) or 2500° C. (high-modulus (HM) types).

Since PAN fibers melt at temperatures of over 200° C., without further precautions they would form lumps, stick to one another and lose their shape. To prevent this, the fibers are stabilized in a dedicated process step, i.e. the PAN is broken down to form an unmeltable ladder polymer, releasing in particular hydrocyanic acid (HCN), under oxygen. Therefore, it is also possible to refer to oxidized PAN fibers. The fibers no longer melt and retain their shape.

Untreated and freshly produced fibers—including carbon fibers—have a surface which can be damaged by the further processing of the fibers or is unsuitable for the intended use of the fibers. Consequently, the fiber surface is activated by oxidation and covered with a thin film of a viscose agent. These viscose agents may have very different compositions and are referred to as sizes.

DIN is the abbreviation for a German standards system. The DIN 51909 standard defines the conditions for determining the coefficient of linear thermal expansion of solids. The DIN 51930 standard describes the production of the specimens required.

SUMMARY OF THE INVENTION

The objects are achieved by the high-grade coke according to the invention by virtue of the fact that, in accordance with the characterizing clause of claim 1, this coke is defined by its production as described below.

Carbon fibers or stabilized precursor fibers for forming carbon fibers were introduced into the flow of incoming feedstock for the delayed coking process. The feedstock belonged to the group of highly aromatic residues of the vacuum distillation of crude oil products, of the fluidized catalytic cracking process, of visbreaking, of thermal cracking or of ethylene pyrolysis. The group also included highly aromatic products from coal coking, such as for example soft pitches, which were produced by distillation of the highly aromatic residues of coal coking.

The mixture of carbon fibers or stabilized precursor fibers for forming carbon fibers was coked in a delayed coker corresponding to the prior art.

The feedstock for coking processes, in particular for delayed coking, contained from 15 to 30% of carbon residue. The other constituents of this feedstock were volatilized during coking or during the subsequent calcining. In the process, in a delayed coker, at a gas pressure of 0.4 to 1.4 MPa, temperatures of 550° C. were reached, and in a calcining furnace (rotary tubular furnace or plate calciner), significantly higher temperatures of up to 1500° C. were reached, 15 to 30% by weight of the feedstock entering a delayed coker was left behind in the form of green coke.

To obtain the coke according to the invention, at most 4% by weight of cut carbon fibers or 8% by weight of stabilized precursor fibers for forming carbon fibers was added to the feedstock for the delayed coker. To ensure that the carbon fibers could be metered without problems, it has proven expedient for the fibers to be admixed to the feedstock flow in the form of cut fiber bundles. The cut length of the fibers was between 1 mm and 30 mm.

On account of their high modulus of elasticity, carbon fibers are brittle. In particular fibers of the HM type tend to crumble or shear off when subjected to mechanical treatment. For this reason, what are known as sizes are almost always applied to the carbon fibers immediately after the fibers have been produced. The sizes improve the sliding properties of the endless fibers with respect to one another or the sliding and shearing properties with respect to external bodies or substances to a crucial degree. In the case of the endless carbon fibers based on PAN which are currently most commonly employed, a distinction is drawn between sizes which substantially improve the textile processing process and sizes which substantially improve the incorporation of the fibers into a plastic matrix. The sizes are present in a proportion of up to 0.5% by weight of the fibers.

The processing of carbon fibers which have been cut short has different aspects to the fore than the processing of endless carbon fibers. Since the fibers are already short, they are less sensitive to shearing or else it may be irrelevant whether a small proportion of them is shortened again. On the other hand, the metering properties are important. Short carbon fibres which are not provided with a size or are only provided with a little size have a tendency toward pilling when they are mixed into dry grain mixtures or pasty or viscose mixtures. Wool-like, very light collections of fibers with a large volume, which in their interior contain scarcely any of the pasty or viscose mixtures or grain mixtures which are to be mixed therewith, are formed. Short carbon fibers which are not provided with a size or are only provided with a little size can even in principle, but also on account of production requirements, not be metered successfully and cannot be successfully mixed into the standard mixtures used to produce synthetic carbon products.

To improve the metering properties and the mixing properties, the fiber strands were provided with significantly more than 0.5% by weight of size and then cut to the desired length. Short fiber bundles were formed. These compact, short bundles could be metered successfully and form a bulk bed, in a similar manner to grains, or conveyed on a vibratory sheet. It was also readily possible to mix them into carbon grains or into a pasty or viscose mixture. To enable the short carbon fibers to provide their reinforcing action in the polygranular carbon bodies to be produced from the mixtures, it was necessary for the fibers, which formed only a small proportion, to be distributed as homogenously as possible. It was therefore necessary to ensure that the short fiber bundles provided with ample size were dissolved during mixing with the carbon grains or with a pasty or viscose mixture. This was achieved by two measures: firstly, the size was to be selected in such a way that it softened or acquired a reduced viscosity at elevated temperature, and secondly it was to be mixed into the mixtures at elevated temperature.

In the case of the delayed coking process, the elevated temperature of the feedstock was present. If the short bundles comprising sized fibers were then added to the hot feedstock, the softening of the size in the mixture was ensured by selecting the sizes from the groups consisting of the waxes, in particular the polyolefin waxes based on polyethylene or polypropylene, the montan waxes or the waxes produced synthetically by esterification of fatty alcohols with long-chain fatty acids containing 12 to 40 carbon atoms, the polyurethane, phenolic, polyester or epoxy resins, or the low-viscosity pitches or pitches dissolved in organic solvents. During the coking and calcining, the size was partially converted into carbon. The coke according to the invention produced using the delayed coking process accordingly contained a small proportion of short, well-distributed carbon fibers.

In a delayed coker, the temperatures usually reach at most 550° C. during the production of the coke. A coke of this type still contains a significant proportion of volatile constituents, and consequently it is also known as a green coke. To convert this green coke into a coke which is suitable for the production of synthetic electrographite, it is calcined at temperatures of up to 1400° C. This is carried out in various units, such as for example in a rotary tube calciner, in a rotary plate calciner, in a gas calciner or in an electric calciner.

Carbon fibers even with moderate property levels cost at least 5 to 10 times more per kilogram than the polygranular carbon bodies from mass production. Even compared to special types of fine-grain and reactor graphites, they were twice as expensive. It was therefore endeavoured to keep the proportion of carbon fibers in the polygranular carbon bodies to a low level, with an upper limit of 20% by weight.

The polygranular carbon bodies were produced using various processes. Graphite electrodes with associated connection pieces (nipples) were produced by extrusion. Bodies produced in this way had a preferential direction (anisotropy), with elongate constituents, i.e. including carbon fibers or elongate coke grains with carbon fibers contained therein, oriented in the direction of extrusion.

Since the carbon fibers had a negative coefficient of thermal expansion of $-0.5 \times 10^{-6}$ $K^{-1}$ in the longitudinal direction, extruded graphite electrodes and nipples containing a proportion of carbon fibers or containing coke grains with incorporated carbon fibers in accordance with the invention also had a relatively low coefficient of thermal expansion of at most $0.15 \times 10^{-6}$ $K^{-1}$.

The carbon fiber-reinforced cokes according to the invention, both isotropic and preferably needle cokes, were used to produce polygranular carbon bodies. Carbon fibers were distinguished, inter alia, by a high modulus of elasticity, a high strength and a low coefficient of thermal expansion in the longitudinal direction of the fibers. There were generally gradual differences in the properties of different types of fibers. The highest moduli of elasticity were found in fibers based on mesophase pitch, the highest strengths were found in carbon fibers based on PAN fibers and the highest coefficients of thermal expansion in the longitudinal direction of the fibers were found in the case of isotropic carbon fibers based on pitch. The carbon fiber-reinforced cokes and therefore the polygranular carbon bodies at least proportionately produced therefrom then had properties which bore the stamp of the carbon fibers which they contained. Favorable coefficients of thermal expansion, a high strength or an improved modulus of elasticity were realized in reactor graphites, in fine-grain graphites and in graphite electrodes and their nipples based on the carbon fiber-reinforced cokes according to the invention which they contained.

EXAMPLE

A high-strength carbon fiber of the HF type based on PAN was provided with 5% by weight of a polyurethane size. The sized fiber strand was cut into sections with a length of 6 mm. These short fiber bundles were added to the incoming flow of the feedstock for the delayed coker. The feedstock of the delayed coker comprised highly aromatic refinery residues from the thermal cracker. After the highly aromatic refinery residues had been intensively mixed with short bundles of fibers, the proportion of carbon fibers in the total mixture was 1.5% by weight. The fiber bundles were partially dissolved during mixing, resulting in a substantially homogenous distribution of the carbon fibers in the highly aromatic refinery residues.

The overall mixture stream first of all passed through the continuous heating process in the coker furnace and then through the part of the process which takes place in batch mode in the coker drum. The overall mixture was heated continuously in the coker furnace to 550° C., at a pressure of from 0.4 to 0.5 MPa. The residence time of the overall mixture was at most three minutes in the tube system of the coker furnace, with hot steam assisting the conveying action in the tube system.

The hot overall mixture was then passed into the coker drum. The formation of coke, which takes place via the mesophase, commenced building up from the bottom of the drum, while the volatile constituents escaped to the top of the drum, from where they were partially fed back to the coker via a distillation column (partial recycling). The coker drum was generally filled to the top edge, apart from a residual height of a few meters, over the course of approximately 24 hours. The incoming flow of the hot overall mixture for this drum was then interrupted and diverted to a second, empty drum which was ready for use.

In the meantime, the solid constituents in the first drum had solidified sufficiently for it to be possible to speak of green coke. The nature of the highly aromatic refinery residues and the way in which the delayed coker was operated determined the quality of the coke formed, preferably needle coke, containing carbon fibers in accordance with the invention. This green coke was removed from the drum in accordance with the prior art. Green coke was not yet suitable for the production of polygranular carbon bodies. Consequently, this green coke was subsequently heated (calcined) to temperatures of up to 1400° C. The calcined coke was processed to form specimens in accordance with DIN 51930, and then a coefficient of thermal expansion of at most $0.15 \times 10^{-6}$ $K^{-1}$, determined in the direction of extrusion in accordance with DIN 51909, was recorded on these specimens.

I claim:

1. A carbon fiber-reinforced coke, comprising:
 a mixture of:
 a proportion of cut carbon fibers being surface-oxidized or non-surface-oxidized or stabilized precursor fibers for forming PAN-based carbon fibers, and at least one of the following being true for said cut carbon fibers or stabilized precursor fibers upon entering the delayed coker, said fibers or precursor fibers:
 not being provided with a sizing; or
 being provided with a sizing selected from the group consisting of sizings for satisfying objectives of various textile processes; or
 being provided with a sizing selected from the groups consisting of:
 waxes, montan waxes, and waxes produced synthetically by esterification of fatty alcohols with long-chain fatty acids containing 12 to 40 carbon atoms;
 polyurethane, phenolic, polyester, and epoxy resins; and
 low-viscosity pitches and pitches dissolved in organic solvents;
 feedstock for a delayed coking process, said feedstock including a material selected from the group consisting of highly aromatic residues of vacuum distillation, residues of visbreaking, residues of a fluidized catalytic cracking process, residues of thermocracking, residues of ethylene pyrolysis, soft pitches produced from coal coking or by distillation of highly aromatic coal residues;
 the mixture having been coked in a delayed coker;
 said feedstock, upon entering the delayed coker, containing at most 4% by weight of said cut carbon fibers or at most 8% by weight of said stabilized precursor fibers; and
 the coke having a coefficient of thermal expansion with values of at most $0.15 \times 10^{-6} K^{-1}$, measured on specimens produced in accordance with DIN 51930 in an extrusion direction and in accordance with DIN 51909.

2. The carbon fiber-reinforced coke according to claim 1 formed as needle coke.

3. The carbon fiber-reinforced coke according to claim 1, wherein said cut carbon fibers or stabilized precursor fibers, upon entering the delayed coker, are from 1 to 30 mm long.

4. The carbon fiber-reinforced coke according to claim 1, wherein said waxes are polyolefin waxes based on polyethylene or polypropylene.

5. The carbon fiber-reinforced coke according to claim 1, wherein the coke is calcined with a calcining device selected from the group consisting of a rotary tube calciner, a rotary plate calciner, a gas calciner, and an electric calciner.

6. The carbon fiber-reinforced coke according to claim 1, wherein said proportion of carbon fibers is less than 20% by weight of the coke.

7. A carbon product, comprising a polygranular carbon body formed with the carbon fiber-reinforced coke according to claim 1 and containing at least 70% by weight of carbon.

8. The carbon product according to claim 7, wherein said carbon fiber-reinforced coke is a needle coke.

9. The carbon product according to claim 7, wherein said polygranular carbon is amorphous carbon or graphitized carbon.

10. The carbon product according to claim 7 formed as a carbon electrode, as a connection piece for a carbon electrode, as a fine-grain graphite and a reactor graphite, as a blast-furnace brick, or as electrodes for aluminum fused-salt electrolysis.

11. A method of producing carbon fiber-reinforced coke, which comprises:
   mixing surface-oxidized or nonsurface-oxidized cut carbon fibers or stabilized precursor fibers for forming PAN-based carbon fibers into a flow of incoming feedstock to a delayed coking process to form a mixture, the feedstock being selected from the group of highly aromatic residues of vacuum distillation, of visbreaking, of the fluidized catalytic cracking process, of thermocracking, of ethylene pyrolysis or soft pitches produced from coal coking or by distillation of the highly aromatic coal residues;
   at least one of the following being true for the cut carbon fibers or stabilized precursor fibers upon entering the delayed coker, the fibers or precursor fibers:
      not being provided with a sizing; or
      being provided with a Sizing selected from the group consisting of sizings for satisfying objectives of various textile processes; or
      being provided with a sizing selected from the groups consisting of:
         waxes, montan waxes, and waxes produced synthetically by esterification of fatty alcohols with long-chain fatty acids containing 12 to 40 carbon atoms;
         polyurethane, phenolic, polyester, and epoxy resins; and
         low-viscosity pitches and pitches dissolved in organic solvents; and
   coking the mixture in a delayed coker;
   the feedstock, upon entering the delayed coker, containing at most 4% by weight of the cut carbon fibers or at most 8% by weight of the stabilized precursor fibers; and
   the coke having a coefficient of thermal expansion with values of at most $0.15 \times 10^{-6} K^{-1}$, measured on specimens produced in accordance with DIN 51930 in an extrusion direction and in accordance with DIN 51909.

12. The method according to claim 11, which comprises forming carbon fiber containing needle coke.

* * * * *